United States Patent [19]

Yamamoto

[11] Patent Number: 5,227,743
[45] Date of Patent: Jul. 13, 1993

[54] AUTOMATIC FILTER ADJUSTING APPARATUS

[75] Inventor: Takeshi Yamamoto, Kanagawa, Japan

[73] Assignee: Kabushiki Kaisha Toshiba, Kanagawa, Japan

[21] Appl. No.: 791,387

[22] Filed: Nov. 14, 1991

[30] Foreign Application Priority Data

Nov. 15, 1990 [JP] Japan .................. 2-307305

[51] Int. Cl.$^5$ ............................. H03G 11/04
[52] U.S. Cl. .................... 333/17.1; 328/167
[58] Field of Search ............... 333/17.1, 17.2, 17.3, 333/167, 174, 205, 207, 209, 176; 381/71; 364/572; 328/167; 307/521; 369/44.11

[56] References Cited

U.S. PATENT DOCUMENTS 4,257,018 3/1981 Masdea et al. ............ 333/17.1
4,858,219 8/1089 Yoshikawa ............ 369/44.11 X

FOREIGN PATENT DOCUMENTS 0110761 8/1979 Japan .
0264009 10/1989 Japan .
61-144912 7/1986 Japan .
59-157806 9/1984 Japan .
0273303 7/1988 European Pat. Off. .

OTHER PUBLICATIONS

Yamamoto et al., IEEE International Conference on Consumer Electronics, Jun. 2-9, 1989, pp. 50-51.
Kawano et al., 8087 IEEE Transactions on Consumer Electronics, vol. 35, No. 4, Nov. 1989, pp. 741-747.
Miura et al., IEEE Transactions on Consumer Electronics, vol. CE-30, No. 3, Aug. 1984, pp. 360-368.
Japanese Patent Publication, Tokkai-sho 63-167513, Jul. 1988.

Primary Examiner—Robert J. Pascal
Assistant Examiner—Ali Neyzari
Attorney, Agent, or Firm—Finnegan, Henderson, Farabow, Garrett & Dunner

[57] ABSTRACT

An automatic filter adjusting apparatus including an adjustable filter having an input and an output, a reference signal generator for providing a reference signal to the filter, a generator for generating an adjusting signal used to adjust the filter, a comparator for comparing the output of the filter to a reference level and a controller for controlling the adjusting signal generator.

11 Claims, 6 Drawing Sheets

AUTOMATIC FILTER ADJUSTING APPARATUS

FIELD OF THE INVENTION

The present invention relates generally to an automatic filter adjusting apparatus, more particularly to an automatic filter adjusting apparatus suitable for band pass filters of audio systems in VTRs.

BACKGROUND OF THE INVENTION

In video tape recorders (hereinafter referred to as VTR), such as "Hi-Fi VTRs", a so-called deep layer recording technique has been recently developed. In this technique, two channel audio signals are modulated with different frequencies and then multiplexed with each other. The multiplexed FM (frequency modulation) audio signal is recorded on an audio track of a video tape over a relatively thick layer thereof.

In a reproducing operation, the multiplexed FM audio signal is reproduced from the audio track of the video tape by a reproducing head. Then two channel audio signals are separated from the multiplexed FM audio signal, by using band pass filters (BPFs) with different frequency bands.

Shown in FIG. 1 is a block diagram illustrating an audio system of conventional Hi-Fi VTRs. Two channel audio signals, i.e., left (L) channel and right (R) channel audio signals, are applied to L channel and R channel de-emphasis encoders 2, 3 of a recording system. These encoders 2, 3 constitute a well-known noise reduction system in cooperation with emphasis decoders 15, 16 in a reproduction system, which will be referred later. In the encoders 2, 3, the L channel and R channel audio signals have their amplitudes expanded at a prescribed frequency level to remove noise components. The expanded amplitude audio signals are applied to FM modulators 4, 5, respectively. The L channel, R channel FM signals are then combined together in a mixer 6. The combined signal is supplied to a recording head 8 after amplified by an amplifier 7. The signal is then recorded on an audio track of video tapes (not shown).

In a reproducing system, the recorded signal is reproduced through a reproducing head 9. The reproduced signal has the configuration of the multiplexed FM audio signal. The reproduced signal from the reproducing head 9 is then applied to both an L channel BPF 11 and an R channel BPF 12 through an amplifier 10. These BPFs 11, 12 have different frequency bands which correspond to the frequencies of the FM modulators 4, 5, respectively. Thus, the L channel FM audio signal is extracted from the L channel BPF 11, while the R channel FM audio signal is extracted from the R channel BPF 12. These FM audio signals are applied to FM demodulators 13, 14 so that audible band L channel and R channel audio signals are demodulated therefrom. These audible band L channel and R channel audio signals are applied to the above-mentioned emphasis decoders 15, 16. In the emphasis decoders 15, 16, the L channel and R channel audio signals have their amplitudes compressed at a prescribed level which is complementary to those of the de-emphasis encoders 2, 3. Thus the original L channel and R channel audio signals are obtained through output terminals.

In these Hi-Fi VTRs, such audio recording and reproducing systems have been increasingly integrated into one chip ICs. However, the BPFs 11, 12 are difficult to incorporate into such one chip ICs, because a remarkable fluctuation of frequency characteristics thereof. When an ordinary semiconductor manufacturing process is used, resistance and capacitance, which determine the frequency characteristics of filters, generally fluctuate by about ±20%.

The center frequencies of the L channel and R channel FM audio signals of VHS VTR have been specified at 1.3 MHz and 1.7 MHz with maximum deviation ±50 KHz. Therefore, the passbands of the BPFs described above have been set as follows:

L channel: 1.15 to 1.45 MHz

R channel: 1.55 to 1.85 MHz

That is, these passbands are isolated by a narrow band of only 1,000 KHz so that the channel separation performance can be remarkably deteriorated unless the centers of the BPFs are precisely realized.

If the BPFs 11, 12 are manufactured using the semiconductor manufacturing process described above, fluctuation of the center frequencies (with resistance and capacitance fluctuation ±20%) become too large as expressed as follows:

L channel: 0.83 to 1.83 MHz

R channel: 1.09 to 2.45 MHz

This shows that their fluctuation ranges overlap each other so that it is difficult to incorporate the BPFs into ICs.

So as one technique to incorporate filters into ICs, a combination of filters and adjusting circuits for the filters is conventionally employed.

FIG. 2 shows an R channel filter 27 in the form of a BPF and an adjusting circuit for the BPF 27. In FIG. 2, an FM audio signal is applied from an input terminal 27a to the BPF 27. An output of the BPF 27 is led to an output terminal 27b. The time constant of the BPF 27 is adjusted by an automatic time constant adjusting circuit 18 as follows. The automatic time constant adjusting circuit 18 is constituted by an integration circuit 17, a switch 21, a peak hold circuit 20, a comparator 19 and a reference voltage source 25. The integration circuit 17 includes a variable transconductor 24 with its input terminals supplied with a reference voltage Vref from a reference voltage source 25, a capacitor 22 coupled to the output terminal of the transconductor 24 and a variable current source 23 for biasing the transconductor 24. The switch 21 is connected in parallel to the capacitor 22 for periodically short-circuiting the capacitor 22 under the control of a clock signal. Thus a triangular pulse signal as shown in the drawing is generated on the terminal of the capacitor 22.

The triangular pulse signal is applied to the peak hold circuit 20, wherein the peak voltage of the triangular pulse signal is held. The peak voltage is supplied to an input terminal of the comparator 19. The comparator 19 compares the peak voltage with the reference voltage Vref. Then a difference voltage obtained on the output terminal of the comparator Ig is supplied to a capacitor 26 having a large capacitance for charging it. The terminal voltage of the capacitor 26 is applied to both the BPF 27 and the variable current source 23. The voltage applied to the current source 23 causes the control current of the current source 23 to vary. Thus, the integration circuit 17, the switch 21, the comparator 19, the capacitor 26 and the current source 23 constitute a control loop for automatically adjusting the time constant of the transconductor 24.

According to the control loop, the transconductance gm of the transconductor 24 is varied by a difference between the peak level of the triangular pulse signal and the reference voltage Vref. The variation of the transconductance gm causes the amount of a current applied to the capacitor 23 from the transconductor 24 to vary. Thus, the slope of the triangular pulse signal varies in response to the amount of the current. Thus, when the peak level is higher than the reference voltage Vref, the slope becomes lower. On the other hand, when the peak level is lower than the reference voltage Vref, the slope becomes higher. Thus, the peak level of the triangular pulse signal comes to agree with the reference voltage Vref. Under the controlled status the following relation is maintained.

$$T/2 = Co/gm \qquad (1)$$

wherein T denotes a pulse period of the clock signal and Co denotes the capacitance of the capacitor 22.

The above equation (1) represents that the right side, which represents the time constant of the integration circuit 17, is defined by only the pulse period T. In other words, the time constant of the integration circuit 17 is precisely adjusted if the clock signal has a stable frequency.

Here, it is assumed that the automatically adjusted BPF 27 also consists of a variable transconductor of the same type as the transconductor 24 in the automatic time constant adjusting circuit 18. It is also assumed that an adjusting signal Va applied to the BPF 27 from the automatic time constant adjusting circuit 18 is the same as the signal applied to the current source 23 of the integration circuit 17. Under these conditions, the transfer function H(S) of the BPF 27 subjected to the adjustment, which is the same as that of the transconductor 24, is expressed by the following equation.

$$H(S) = F([Co/gm] \cdot S) \qquad (2)$$

Therefore, the time constant of the BPF 27 is accurately decided by the automatic time constant adjusting circuit 18. Thus the frequency characteristics of the BPF 27 is decided relying only the accuracy of the automatic time constant adjusting circuit 18, i.e., the error of the time constant Co/gm of the integration circuit 17.

However, it is well known that a high accuracy of the time constant Co/gm is difficult to achieve in the conventional system as shown in FIG. 2, due to several error factors as described below.

a) In the automatic time constant adjusting circuit 18 itself, due to an adjusting error caused by an offset of the reference voltage Vref, etc.

b) Mismatch between the variable transconductor 24 and the capacitor 22 of the automatic time constant adjusting circuit 18 and the variable transconductor and the capacitor in the BPF 27 to be adjusted.

c) Mismatch between the variable current source 23 of the automatic time constant adjusting circuit 18 and a corresponding variable current source in the BPF 27.

In particular, in large scale integrated circuits (LSIs) a plurality of filters are often adjusted collectivley by one automatic adjusting circuit. In this case, it is difficult to incorporate the automatic adjusting circuit and filters on an IC chip adjoining or located closely to each other and characteristic errors due to the error factors as described in a) and b), tend to occur. It is therefore the present state that adjusting accuracy still has an error of about ±5%. This amount of error has been considerably improved when compared with the error of about ±40% in the case of unadjusted filters, but it is still insufficient.

Now, by applying the above concepts to the channel separating BPFs of the "VHS Hi-Fi" VTR described above, assuming that the control characteristic of those filters are controlled by the automatic adjusting circuit having a ±5% error, the center fluctuations of the filters are as follows:

L channel: 1.235 to 1.366 MHz

R channel: 1.615 to 1.785 MHz

For instance, such as BPF has a sharp attenuation characteristic as shown in FIG. 3. If the passing band center frequency of such a filter deviates largely from the actual FM signal frequency, not only the channel separation is deteriorated, but, when FM signals having wide spectra in case of large amplitude or when high modulation frequencies are applied, distortion after demodulation is also increased.

It is therefore indispensable for BPFs to have a means to perform the manual adjustment from the outside and furthermore, the adjustment is necessary for every channel.

As described above, the conventional automatic filter adjusting system requires an accurate clock and a capacitor having a large capacitance but it has such defects that temperature drift and voltage drop drift tend to occur and their compensation is difficult and furthermore, circuit scale can become large.

SUMMARY OF THE INVENTION

It is, therefore, an object of the present invention to provide an automatic filter adjusting apparatus which is able to automatically adjust filters to desire frequency characteristics.

Another object of the present invention is to provide an automatic filter adjusting apparatus which is able to be made in one chip IC.

In order to achieve the above object, an automatic filter adjusting apparatus according to on aspect of the present invention includes an adjustable filter having an input and an output, a reference signal generator for providing a reference signal to the filter, a generator for generating an adjusting signal used to adjust the filter, a comparator for comparing the output of the filter to a reference level and a controller for controlling the adjusting signal generator.

Additional objects and advantages of the present invention will be apparent to persons skilled in the art from a study of the following description and the accompanying drawings, which are hereby incorporated in and constitute a part of the specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 4 through 6.

Figure 1:
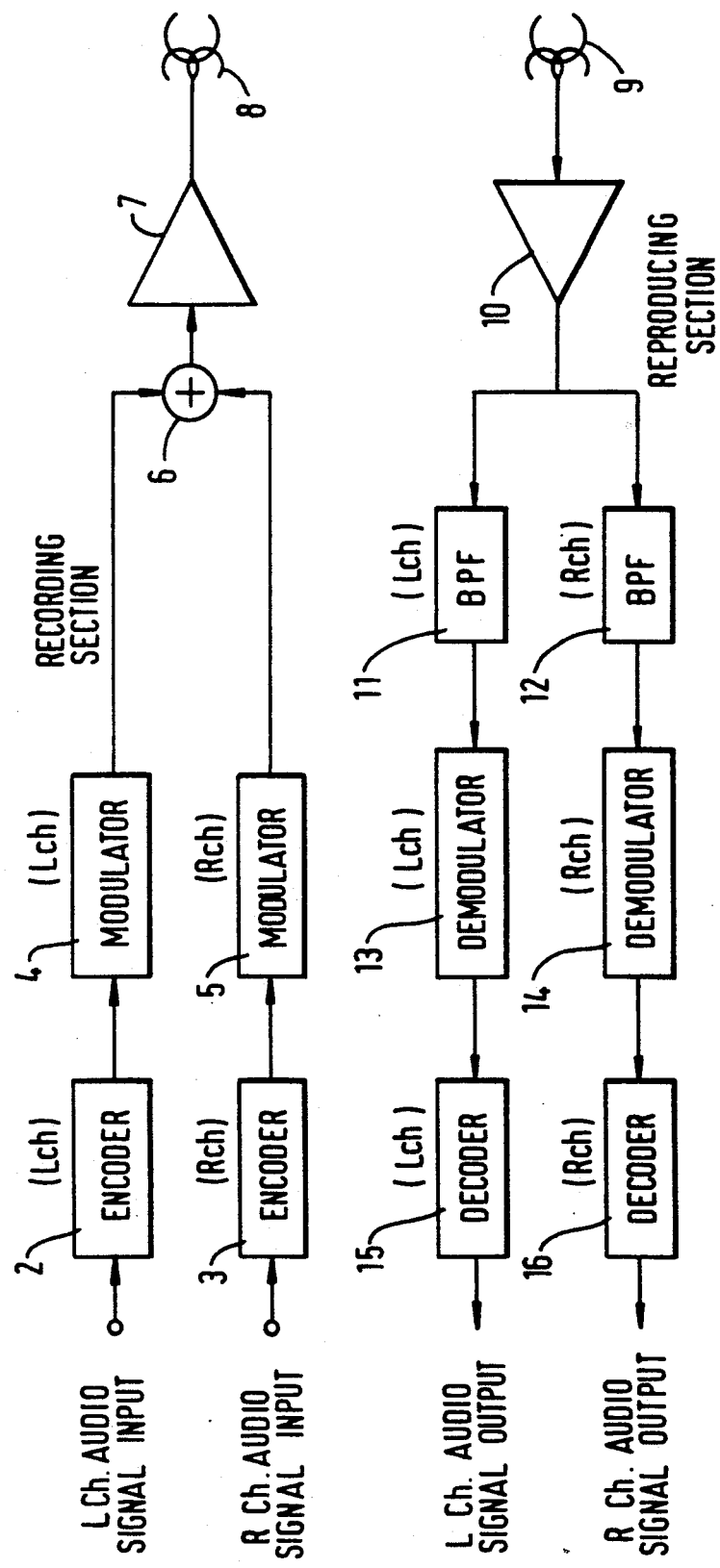
FIG. 1 is an explanatory diagram showing the recording and reproducing system of a VTR.
Figure 2:
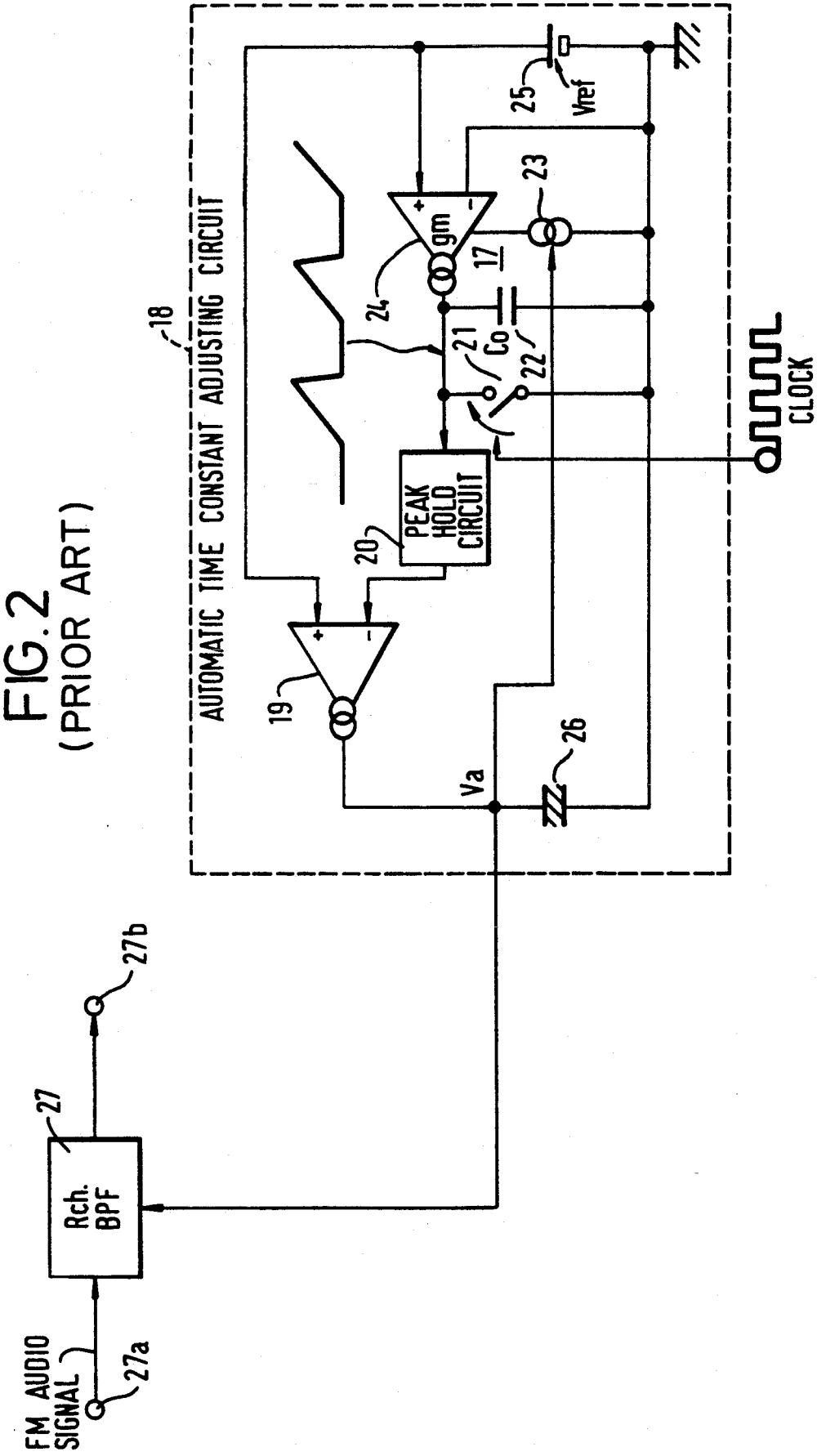
FIG. 2 is a diagram showing the BPF automatic adjustment circuit.
Figure 4:
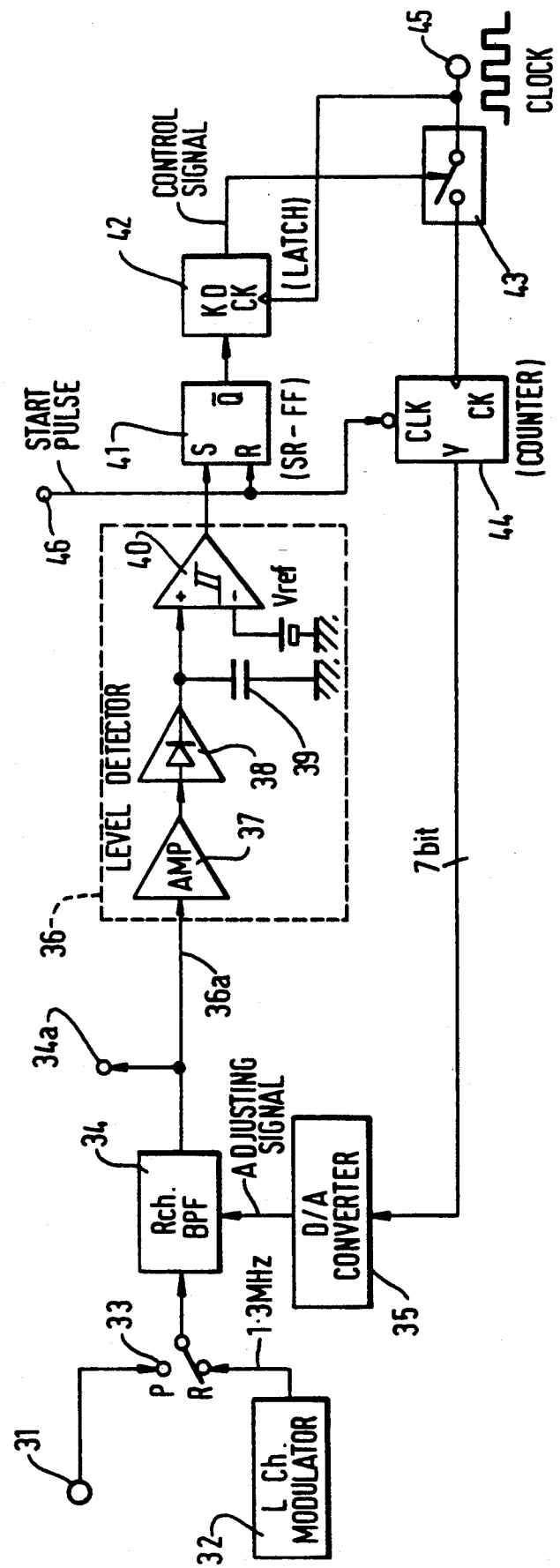
FIG. 4 is a circuit diagram showing one embodiment of the present invention.
Figure 5A:
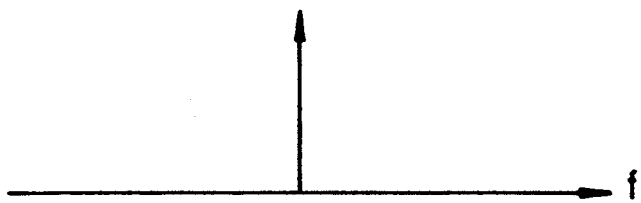
FIG. 5A is a diagram showing a reference FM signal for use of the adjusting circuit of FIG. 4.

Shown in FIG. 4 is a first embodiment of the present invention. FIG. 4 shows an adjusting circuit for a BPF such as an R channel BPF 34 (corresponding to, the BPF 12 of FIG. 1) of an audio system of "Hi-Fi VTRs".

Under a normal operating condition, an R channel audio signal is applied to the BPF 34 through a switch 33. The switch 33 is adapted for selectively applying either the R.channel audio signal from an input terminal 31 or a non-signal carrier from a modulator 32 of the other channel. The output from the output terminal 34a of the BPF 34 is applied to a demodulator (not shown) of a next stage.

The automatic adjusting circuit according to the present invention is characterized by that is adjusts the frequency characteristics of the filters, e.g., the R.channel BPF 34 as described above. The BPF 34 has incorporated, for instance, a variable transconductor and is capable of setting up frequency characteristics by controlling current from the current source of the variable transconductor. The adjusting signal for the frequency characteristic adjustment is given from a digital/analog converter 35. During the period of the normal operation of a VTR, that is, when the VTR is performing the reproduction operation, the adjusting signal is held at a set value.

When the frequency characteristics of the BPF 34 are adjusted, the construction and control shown in the following are used.

First, the output terminal of the BPF 34 is connected to the input terminal of a level detector 36. The level detector 36 consists of an amplifier 37 to which an input terminal 36a of the level detector 36 is connected, a DC converter 38 which detects the output from the amplifier 37, a capacitor 39 which smooths the output of the DC converter 38, and a comparator 40 which compares the output from the capacitor 39 with a reference voltage Vref.

The comparator 40 outputs a coincidence pulse when the terminal voltage of the capacitor 39 agrees with the reference voltage Vref and sets a flip-flop circuit 41. When the flip-flop circuit 41 is set, its Q output becomes high level and is latched by a latch circuit 42 to turn off a switch 43. When the switch 43 is turned off, a clock being supplied from a terminal 45 to a counter 44 is stopped and a count value of the counter 44 is held at its current state. The output from the counter 44 is applied to the D/A converter 35.

Accordingly, in adjusting the characteristics of the BPF 34, the flip-flop circuit 41 is first reset by the start pulse from the terminal 46 and the counter 44 is cleared. Then, the switch 43 is turned ON K clocks later. As a result, the output from the D/A converter 35, that is, the adjusting signal, becomes large with the increase of a count value of the counter 44. Then, the frequency characteristic of the BPF 34 is shifted in the direction of higher frequency on the frequency axis according to the change of the adjusting signal.

Thus, the center frequency of another channel being supplied to the BPF 34 from the modulator 32 is gradually attenuated. Then, when a sufficient attenuating characteristic is obtained (the center frequency band of the channel), the supply of clock signals is stopped, the counter stops to operating, and the adjusting signal at that time is held.

Figure 3:
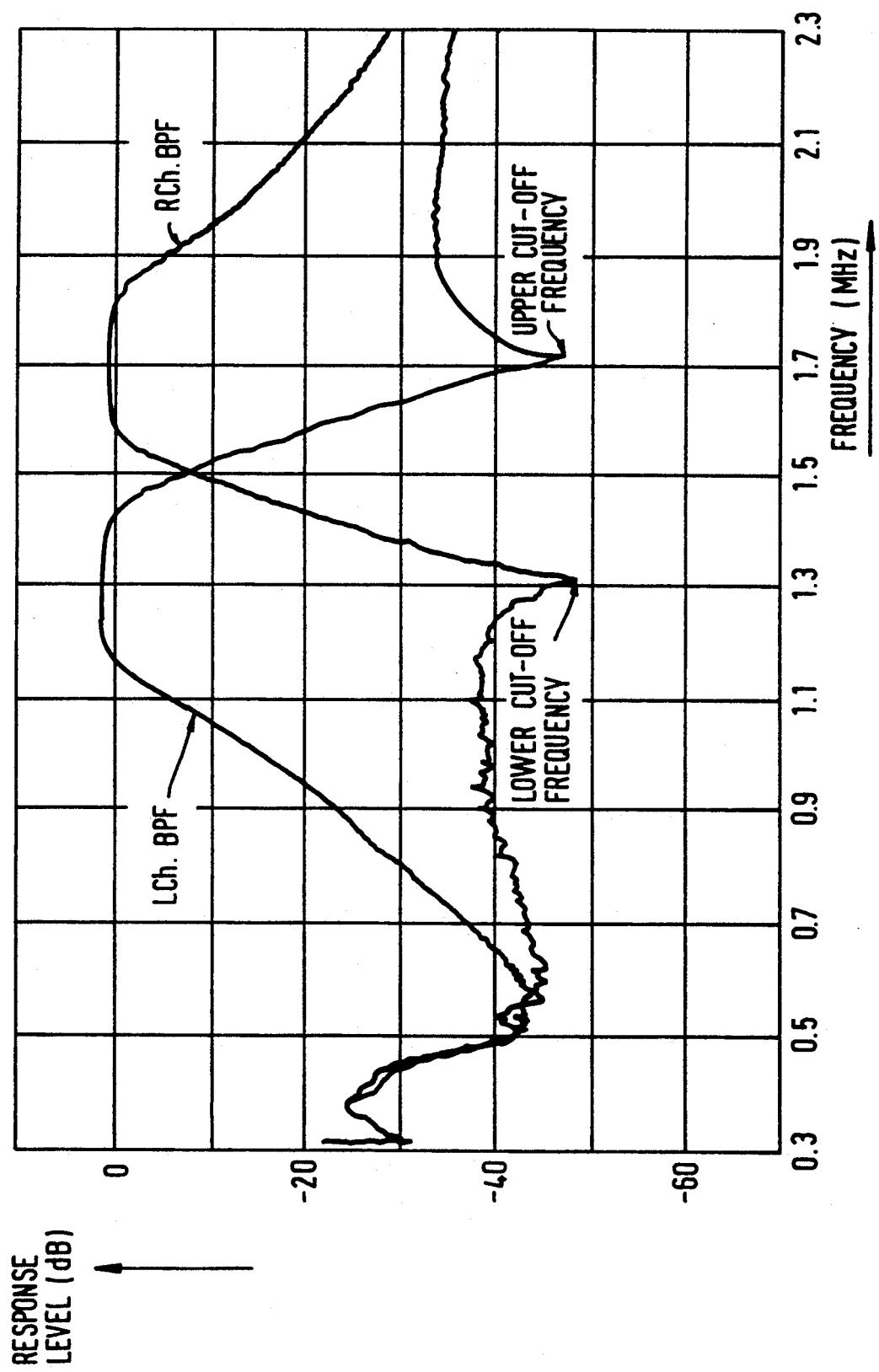
FIG. 3 is an explanatory diagram showing the FM signal frequency bands of the left and right channels of VTR.

FIG. 3 shows the ideal relation between the center frequency of the adjusted channel and another channel and the frequency characteristics of the BPF of each channel. The band-pass characteristic indicates FM signal frequency bands of, for instance, the L and R channel of the audio system of Hi-Fi VTRs. On the other hand, the center frequencies of FM signals of L channel and R channel are specified as follows:

L channel: 1.3±10 KHz

R channel: 1.7±10 KHz

Therefore, the highly precise adjustment of the filters is necessary.

Figure 5B:
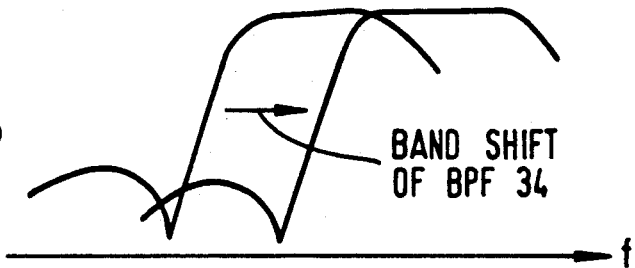
FIG. 5B is a diagram showing a shift of BPF characteristic of the BPF 34 of FIG. 4 during an adjusting operation.

When the adjustment of the BPF 34 of the R channel is started, the center frequency (1.3 MHz) (FIG. 5A) which becomes the reference frequency for the L channel is applied to the BPF 34 by the switch 33. As the adjusting signal changes gradually, the band pass characteristic of the BPF 34 is shifted gradually from the low frequency region to the high frequency region as shown in FIG. 5B.

Figure 5C:
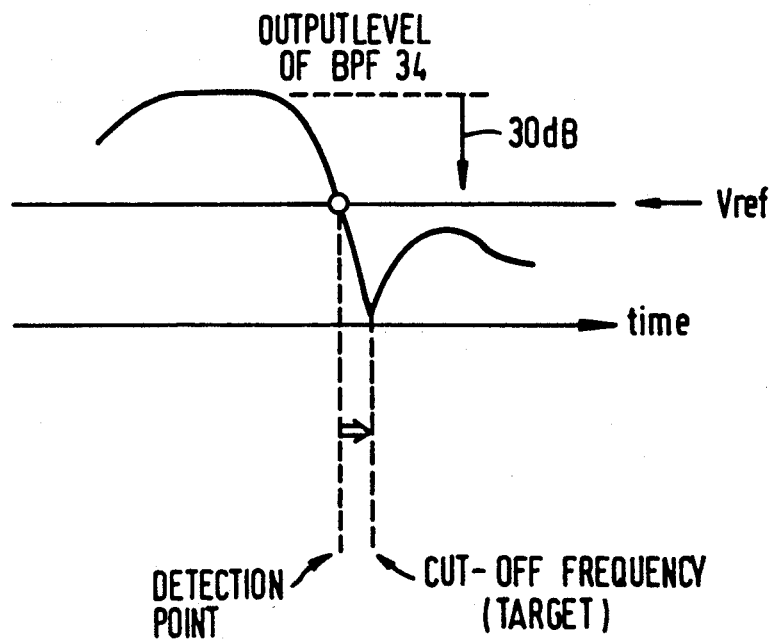
FIG. 5C is a diagram showing a level change of the output from the BPF 34 of the FIG. 4 during the adjusting operation.

Therefore, first, the center frequency 1.3 MHz passes while getting a sufficient gain, but it is gradually attenuated and finally, the output characteristic of the BPF 34 becomes that shown in FIG. 5C. The characteristic corresponds to the input to the comparator 40 of the level detector 36. If the reference voltage Vref is set at −30 dB as shown in FIG. 5C, after passing the K clocks period, the supply of clocks is stopped, and it becomes possible to set the frequency characteristics at the level (the ideal frequency characteristics of the R channel shown in FIG. 3) where another channel's center frequency can be fully attenuated. Thereafter, the value of the counter 44 at that time is held and the characteristics after the adjustment are maintained.

It is the premise that the output of another channel's FM demodulator that is to be used in the adjustment is an unmodulated signal and its center frequency is 1.3 MHz. Therefore, the filter adjustment is made for each channel at the time of the system start-up, when the system is paused or at the time of the recording. To maintain the adjusting signal for each channel at the finally adjusted level, a counter similar to the counter 44 or a latch circuit is provided for each channel.

The clock suspending function at the time of the filter adjustment will be further explained below.

As shown in FIG. 5C, the coincidence pulse is obtained from the comparator 40 at a level of −30 dB and the supply of clock signals is stopped at the eighth clock after detecting the coincidence pulse. The is because it has been so set that the output amplitude becomes minimum when the output from the BPF 37 is attenuated at 1.3 MHz. The comparison level by the reference voltage Vref should be as deep as possible because more precise adjustment becomes possible.

However, as seen from the attenuating characteristic, attenuation around the extremity of attenuation is very sharp and to get an accurate detection at a deep comparison level it is necessary to make the comparison steps fine by increasing the bit size of counters. However, when the bit size is increased, the circuit size also becomes larger.

Furthermore, because the depth of the extremity of attenuation tends to fluctuate based on the actual filter characteristics, it is not advisable to set the comparison level too deep. So, in the embodiment shown the comparison level has been set several clock signals on the side of the extremity of attenuation to assure positive detection with a lower number of bits, as described above. Thus, the comparison level can be set relatively shallow and the location of the extremity of attenuation can be precisely estimated without detection error and free from influence of characteristic fluctuation.

As an illustrative embodiment, it is assumed that the bit size of the counter 44 is 7 bits, the clock signal is 100 KHz, fluctuation of the passive elements such as resistors and capacitors in IC chips is ±20%, the range of fluctuation of the center frequency of the BPF before adjusting is 1.09 to 2.45 MHz, the adjusting step is 10.6 KHz with the same adjusting range as the fluctuation range, fluctuation of the center frequency of the BPF after adjustment will become 1.695 to 1.705 MHz.

The fluctuation is about 1/17 of conventional filter fluctuation and sufficient accuracy is obtained. In principle, it is possible to further promote accuracy when the number of bits of the counter is further increased. Further, a time required for the adjustment is as short as maximum 1.28 sec. and there is no restriction by the adjusting time.

According to the embodiment, as characteristics of a filter subject to the adjustment are directly measured, factors for causing adjustment errors such as element accuracy are lower but there is an advantage of high adjustment accuracy and in addition, in principle it is possible to select the adjusting mode at any time except the reproduction mode. Therefore, the adjustment can be updated for drifting factors of the filter characteristics such as temperature, supply voltage change and the like.

In addition, as the entire system can be completely constructed on a single chip, the embodiment has such merits as external elements and excess IC pins are not required and accuracy of D/A converter is not needed.

Further, as shown in FIG. 4, a high accuracy signal is often available as the reference signal in the system without providing a special source for generating a reference signal and as the signal is effectively usable, a system of efficient price utilization can be constructed. Needless to say, an external input signal or a system clock signal can be used as the reference signal.

In the above description for illustratively adjusting the R channel BPF 34, an up-counter is used for the counter 44 to shift the BPF characteristic to a higher frequency region. When it is intended to adjust a L channel BPF, a non-signal carrier with the center frequency of 1.7 MHz and a cut-off frequency of 1.3 MHz, which is used for a R channel recording/reproducing is utilized for the adjustment. Thus, a down-counter is used for the counter 44 to shift the BPF characteristic to a lower frequency region.

Figure 6:
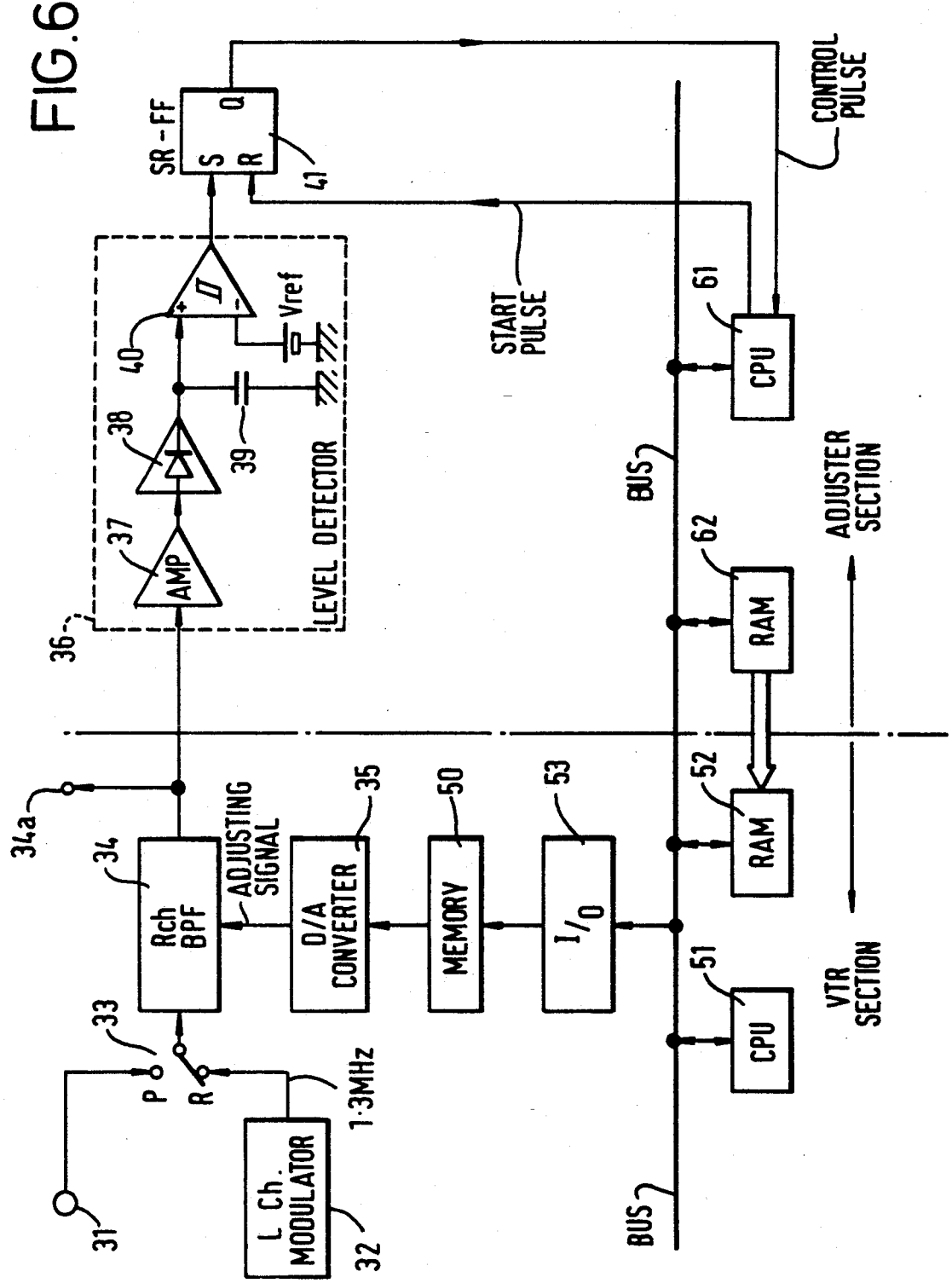
FIG. 6 is a circuit diagram showing another embodiment of the present invention.

FIG. 6 shows another embodiment of the present invention. The embodiment shown in FIG. 4 is an example of the on chip adjustment performed every time. In the embodiment shown in FIG. 6, the adjustment is made in the VTR manufacturing process and adjustment data is stored in a ROM. The principle of adjustment is the same as the preceding embodiment.

The embodiment of FIG. 6 is effective for a system where the control IC is connected by the internal bus in a system with the host CPU of VTR set. The same symbols as in FIG. 4 have been assigned to the circuits with the same purpose as those shown in FIG. 4.

In the embodiment of FIG. 6, the filter characteristics in the normal operation are set by giving data stored in the memory 50 to the D/A converter 35 as the control quantity.

That is, the control data for setting up frequency characteristics has been pre-stored as the optimum data in the memory 50, and is read under the control of the CPU 51 in the VTR, and given to the D/A converter 35. The data is given, for instance, when the power source is turned ON.

Next, the construction and operation to store control data in the memory 50, that is, to get optimum control data in the adjustment explained in the embodiment shown in FIG. 4, will be explained. The flip-flop circuit 41 is reset by the CPU 61 that is used as the adjusting unit in the manufacturing process. Further, the center frequency of another channel from the modulator 32 in the VTR is applied to the BPF 34 via the switch 33. The output from the BPF 33 is applied to the level detector 36. When the coincidence pulse is obtained from the comparator 40 of the circuit 36, the flip-flop circuit 41 is set and its output is read by the CPU.

It will be easily understood that for the period from the start of adjustment until the coincidence pulse is obtained, data equivalent to a count value of the counter 44 is output from the CPU 61 and given to the D/A converter 36 via the input/output circuit 53 and the memory 50, and the characteristics of the BPF 33 are shifted on the axis of frequency. The adjustment results in the coincidence pulse. When the coincidence pulse is obtained, the CPU 61 stores the data being output in the RAM 62 several clock signals later as explained in FIG. 5C. Then, the data stored in the RAM 62 is read by the CPU 51 in the VTR and transferred to the RAM 52 under the control of the CPU 51.

Thus, even when the external adjusting unit is removed, the optimum control data for setting the characteristics of the BPF are held in the RAM 52. Thereafter, the CPU 51 stores the optimum control data in the memory 50 via the input/output circuit 53.

According to the embodiment described above, optimum control data for BPF can be stored in a memory utilizing the CPU incorporated in a VTR. It is therefore not necessary to construct the adjusting circuit on a chip as described in the above embodiment and the circuit scale can be simplified.

As described above, the present invention can provide an extremely preferable automatic filter adjusting apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An automatic filter adjusting apparatus, comprising:
    an adjustable filter having an input and an output;
    means for providing a reference signal to the filter;
    means or generating an adjusting signal used to adjust the filter, said generating means including a clock input, means for counting the clock and a digital to analog converter for converting a count of the counter means to an analog signal;
    means for comparing the output of the filter to a reference level; and
    means responsive to the comparing means for controlling the adjusting signal generating means, said controlling means including a switch coupled between the clock input and the counter means.

2. An automatic filter adjusting apparatus as claimed in claim 1, wherein the counter means includes an up-counter.

3. An automatic filter adjusting apparatus as claimed in claim 1, wherein the counter means includes a down-counter.

4. An automatic filter adjusting apparatus as claimed in claim 1, wherein the controlling means includes a delay means for delaying the switch.

5. An automatic filter adjusting apparatus as claimed in claim 1, wherein the reference signal providing means includes means for supplying a frequency signal which has a frequency equal to he cut-off frequency of the filter.

6. An automatic filter adjusting apparatus, comprising:
    an adjustable filter having an input and an output;
    means for providing a reference signal to the filter;
    means for generating an adjusting signal for adjusting the filter, including a CPU for generating an optimum adjusting signal;
    means for comparing the output of the filter to a reference level; and
    means responsive to the comparing means for controlling the adjusting signal generating means.

7. An automatic filer adjusting apparatus as claimed in claim 6, wherein the adjusting signal generating means further includes a memory means for storing the adjusting signal.

8. An automatic adjusting apparatus used in a dual-channel recording/reproducing system, comprising:
    an adjustable filter having an input and an output;
    means for providing a reference signal to the filter;
    means for generating an adjusting signal used to adjust the filter, including a clock input, means for counting the clock and a digital to analog converter for converting a count of the counter means to an analog signal;
    means for comparing the output of the filter to a reference level; and
    means responsive to the comparing means for controlling the adjusting signal generating means, including a switch coupled between the clock input and the counter means.

9. An automatic filter adjusting apparatus as claimed in claim 8, the reference signal providing means includes means for supplying a frequency signal which has a frequency equal to the cut-off frequency of the filter.

10. An automatic filter adjusting apparatus as claimed in claim 9, wherein the input to the filer of one channel is the carrier signal from the other channel.

11. The method of adjusting a filter, comprising the steps of:
    providing a reference signal to the filter;
    generating an adjusting signal used to adjust the filter, including the steps of:
    inputting a clock signal to a counter through a switch coupled between a clock input and said counter,
    counting the clock signal, and
    converting the count of the clock signal from a digital signal to an analog signal;
    comparing the output of the filter to a reference level; and
    controlling the generation of the adjusting signal in response to the comparing step including the step of disconnecting the counter from the clock signal by opening the switch.

* * * * *

UNITED STATES PATENT AND TRADEMARK OFFICE
CERTIFICATE OF CORRECTION

PATENT NO.  : 5,227,743
DATED       : July 13, 1993
INVENTOR(S) : Takeshi Yamamoto It is certified that error appears in the above-indentified patent and that said Letters Patent is hereby corrected as shown below:

Claim 5, column 9, line 46, change "he" to the--.

Claim 8, column 10, line 12, insert --filter-- before "adjusting".

Claim 10, column 10, line 33, change "filer" to --filter--.

Signed and Sealed this

Nineteenth Day of April, 1994

Attest:

BRUCE LEHMAN

*Attesting Officer*    *Commissioner of Patents and Trademarks*